Feb. 7, 1967
J. F. HENKEL
3,302,517
XENON OPTICS SYSTEM
Filed Sept. 25, 1964
3 Sheets-Sheet 1
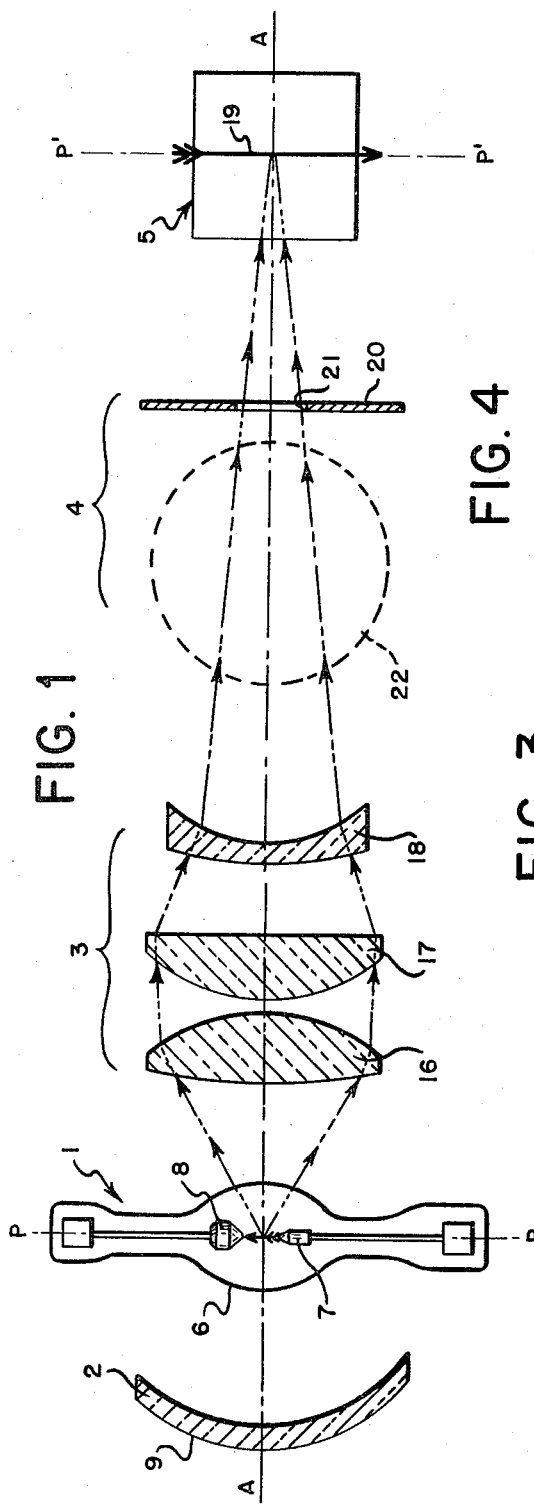
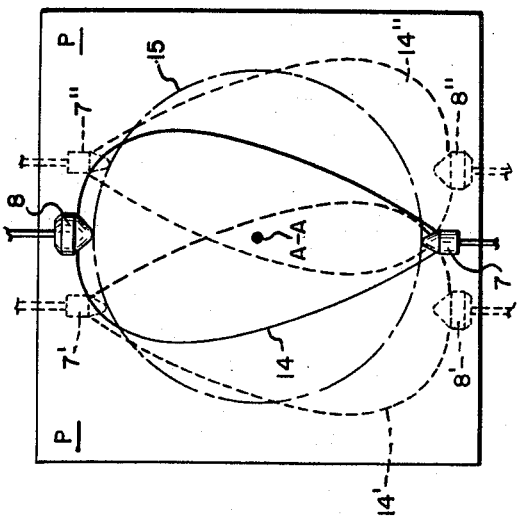
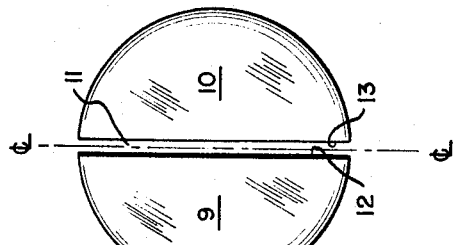
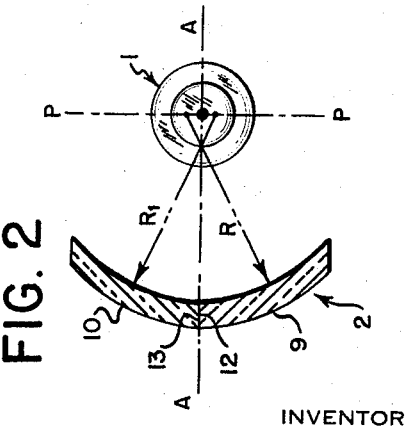
INVENTOR
Joseph F. Henkel
BY
ATTORNEYS

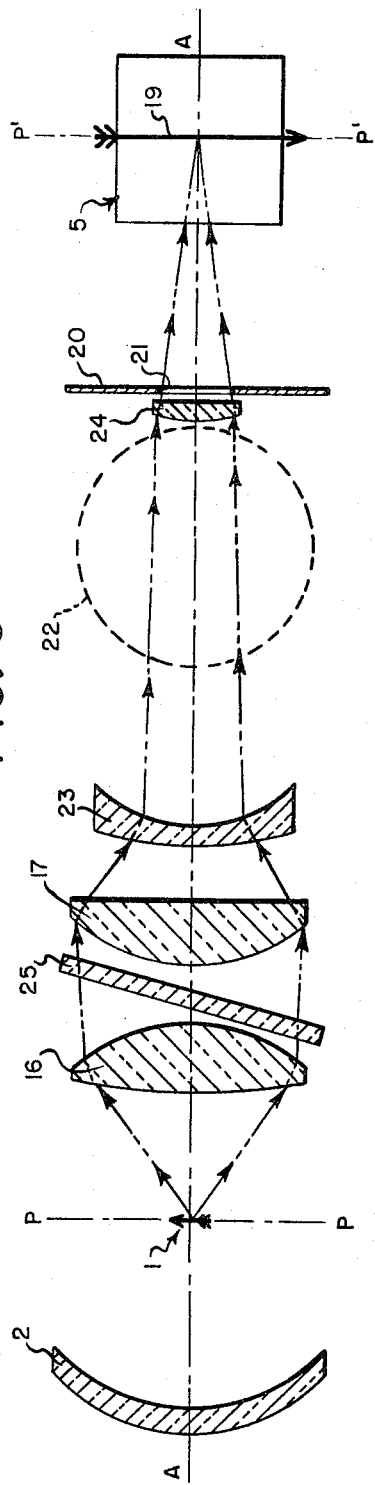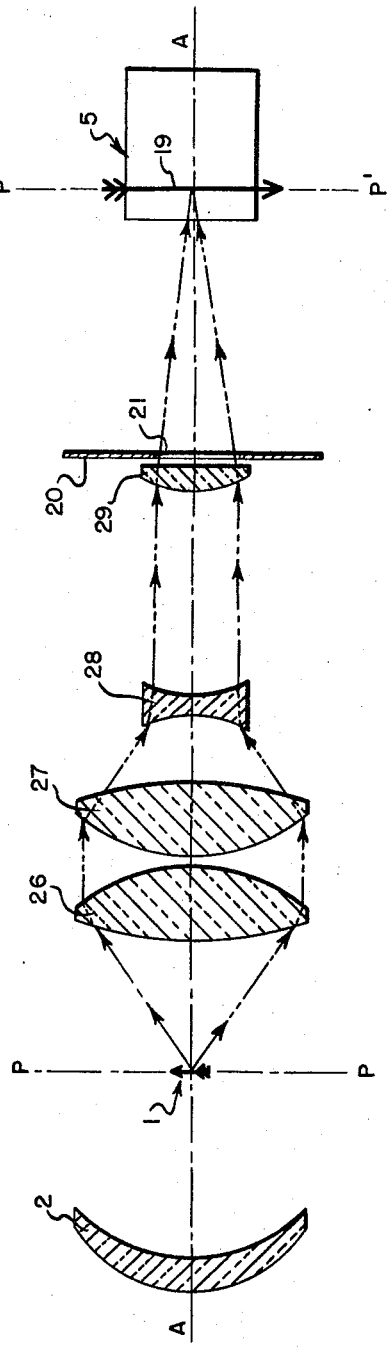

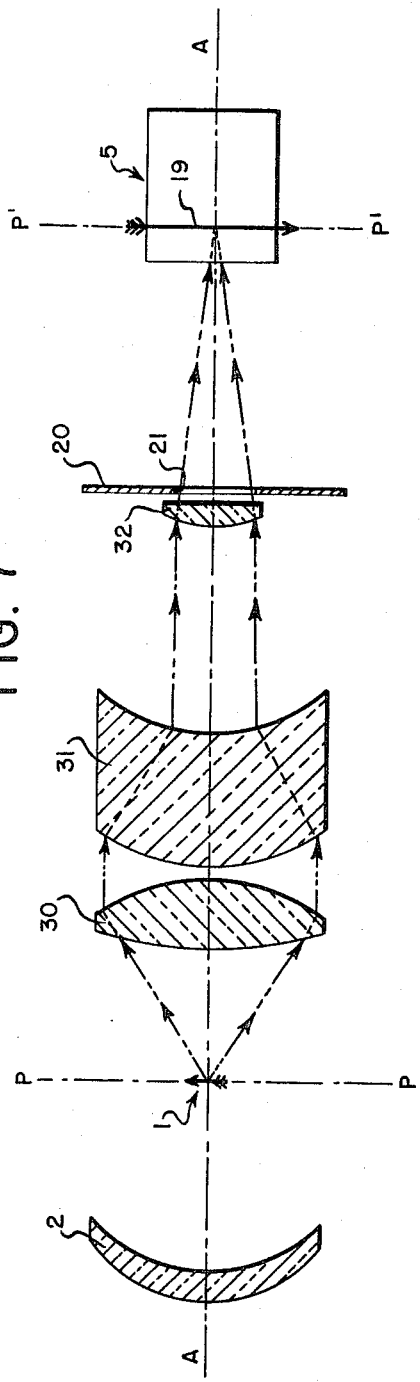
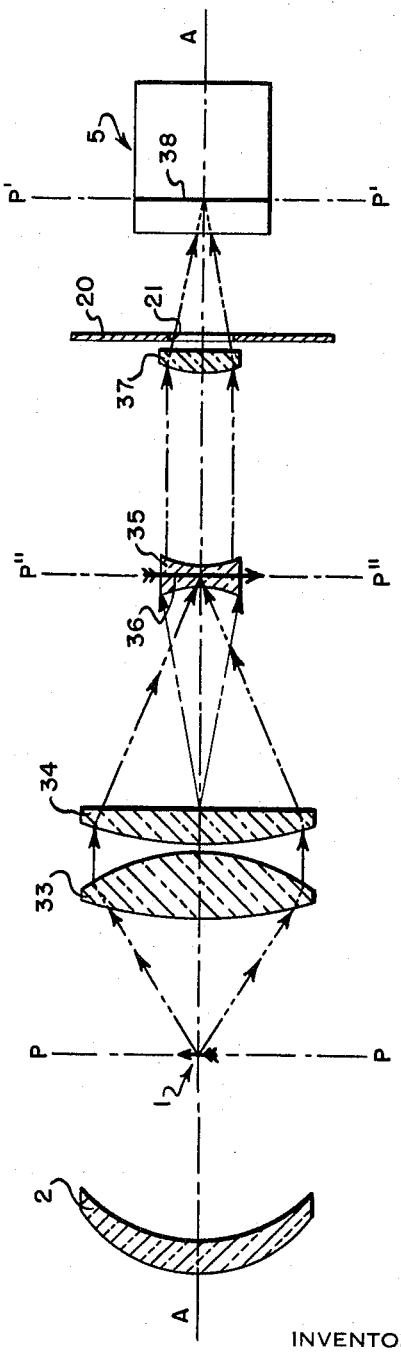
FIG. 7
FIG. 8
INVENTOR
Joseph F. Henkel

United States Patent Office 3,302,517
Patented Feb. 7, 1967

3,302,517
XENON OPTICS SYSTEM
Joseph F. Henkel, 15 Genesee St.,
Hicksville, N.Y. 11801
Filed Sept. 25, 1964, Ser. No. 399,207
23 Claims. (Cl. 88—24)

This invention relates to an improved optics projection system and more particularly to a projection system in which xenon is used as a source of light for projecting an image of a film on a distant screen.

In projecting a source of light through an optical lens system, and in particular through a lens system included in a film projection apparatus, it is generally desirable to have the projected light form a beam of high illuminating characteristic, one that is uniform in brightness or intensity across the projected beam, and one that is substantially pure white in color. High illuminating power is desired so as to produce a bright picture that may be easily seen by the observer although he be at a considerable distance from the picture screen, while uniformity of the intensity of the light passing through the film and onto the screen is desired to prevent fading of any part of the picture that would otherwise be caused in the areas of low light intensity. Also, the light striking the screen should be substantially pure white in color so as to produce the maximum contrast between the colors present in the projected picture and for preventing distortion of the true colors.

In addition to producing a light of specific quality in a projection system, two further factors are of importance in constructing an acceptable projection system and these relate to the heat generated in the system and to the overall size of the projector. Heat generally has an adverse effect on the film tending among other things, to decrease its life span while the size of the projector is of particular importance with portable units where it is desired to transport the unit from one place to another.

In the past, certain improvements have been made in the overall characteristics of projection devices, but generally speaking, it has been found that such improvements have been made at the expense of one or more of the other desired qualities. For example, the use of a xenon light source has been found to be desirable in film projector systems since such a light source at a given wattage will give a greater amount of illumination than is possible when, for example, an incandescent lamp is used. The use of a xenon light source as conventionally practiced, however, presents a number of disadvantages. First of all, the source of light as created between spaced electrodes is extremely non-uniform in its intensity and this non-uniformity when carried through the optical lens system and through the film and onto the distant screen, will be quite noticeable as faded areas across the projected picture. Also, one of the physical characteristics of a xenon light source is that it contains a noticeable blue tone. Analysis shows that this blue tone is concentrated around the cathode electrode and that the light in the center portion of the arc extending between the electrodes is substantially pure white. When, however, this source is passed through a conventional lens system, the blue tone contaminates the entire beam and when this beam is then projected onto the screen, it, in turn, contaminates the colors of the picture and lessens the clarity of the picture.

In analysing a xenon light source, it is also noted that a great majority of the heat contained in the source is present as infra-red light in the same area in which the blue tone is found and consequently this heat when projected through conventional lens systems will heat the film and tend to shorten its life or produce other adverse effects.

In accordance with the teachings of the present invention, an optical lens system has been developed that has particular usefulness in xenon projectors, whereby the above-mentioned objectionable characteristics of xenon light are substantially eliminated from the projecting system so as to produce a lighted area on the distant screen that is substantially pure white in color and of higher and more uniform intensity.

Generally, the present invention comprises an optical lens system having a first lens means for collecting light emitted from a xenon light source into a converging beam and a second lens means for forming an image in the projection lens of the projector that is void of any representation of the portion of the source containing the electrodes or the light which is disposed immediately adjacent thereto.

In one embodiment of the present invention, this type of image is formed in the projection lens by employing a negative lens as the second lens means for imaging the source in a plane extending through the projection lens. The formed image has an overall dimension greater than the diameter of the projection lens so that the periphery of the source including the electrodes and the light that contains the objectionable blue tone is prevented from entering the projection lens and thereby prevented from being projected onto the distant screen. Alternatively, the second lens means may include a negative lens and positive lens combination where the negative lens forms a collimated beam and the positive lens is used for forming an image larger than the diameter of the projection lens in a plane extending therethrough.

Also, where it is found desirable to not only eliminate the blue tone from the light striking the screen but to further prevent such color from passing through the film fed through the projector, the second lens means of the system constructed in accordance with the teachings of the present invention is provided with a lens that is placed at the focal point of the first lens means so that an image of the source will be formed in a plane extending through this lens rather than in a plane extending through the projection lens. Where this arrangement is used, this lens in which the image is formed is made with a diameter smaller than the dimension of the image whereby the image formed in such lens is void of any representation of the electrodes or the light immediately adjacent thereto. Projection of the light forwardly of this lens then projects an image of the first lens means through the film and into the projection lens rather than an image of the source and accordingly effects an elimination of the blue tone present in the source.

The systems described above also function to improve other characteristics of the xenon light source. For example, the uniformity of the light passing through the film and striking the distant screen is improved by converting the beam into one that is substantially collimated, and accordingly of substantially uniform intensity, and passing this beam through the film.

Also, the uniformity of the light in the system is improved according to the teachings of the present invention by modifying the light at its source through a novel reflecting arrangement. Here, certain physical properties of the xenon light are taken into consideration in constructing and positioning the reflecting means whereby a pair of reflected images of the source are formed in the plane of the source at offset positions with respect to each other. With this construction, not only is the uniformity of the light improved, but the intensity thereof is greatly increased over that of conventional arrangements.

A fuller understanding of the present invention may be obtained by a reading of the following detailed description with reference being made to the accompanying drawings of which:

FIG. 1 is a side diagrammatic view of the components of the projection system of the present invention;

FIG. 2 is a top diagrammatic view of the light source and reflector means shown in FIG. 1;

FIG. 3 is a front view of the reflector shown in FIG. 2;

FIG. 4 is a diagrammatic view of the source pattern and reflected images thereof as formed with the arrangement of FIG. 2;

FIG. 5 is a side diagrammatic view of a different embodiment of the present invention;

FIG. 6 is a side diagrammatic view of another embodiment of the present invention;

FIG. 7 is a side diagrammatic view of still another embodiment of the present invention; and FIG. 8 is a side diagrammatic view of still another embodiment of the present invention.

Referring to the drawings and in particular to FIG. 1, the projection system of the present invention is shown as generally comprising a light source 1, a reflector 2, an optical lens system 3, film exposure means 4, and a projection lens 5. Each of these elements are arranged along an axis which defines the optical axis A—A of the system.

In this system, the source 1 comprises a xenon lamp 6 in which a pair of electrodes 7, 8 are positioned. The lower electrode 7 is the cathode and emits electrons which pass across the gap between the electrodes and are received by the upper anode electrode 8. As shown in FIG. 1, the lamp 6 is arranged with the electrodes extending in a plane P extending at right angles to the optical axis. For purposes of description this plane may be termed a vertical plane although it is of course apparent that when the projector unit is placed in actual use, it may be tilted in aiming at a distant screen so that the plane of the lamp source may not be truly vertical.

Disposed along the optical axis A—A at a point behind the lamp 6 is the reflector 2 which preferably comprises a mirror unit formed from a segment of a hemisphere. Specifically, the mirror unit is comprised of two segments 9 and 10 each of which have an equal radius of curvature R and $R_1$, respectively, drawn from spaced points in the vertical plane P. As shown in FIG. 2, which is a view looking down on the system shown in FIG. 1, the radius of curvature R of mirror 9 is drawn about a first center positioned in the vertical plane P that is offset horizontally from the optical axis A—A by a predetermined distance while the radius of curvature $R_1$ of the mirror 10 is drawn about a second center line in the plane P and positioned on the other side of the optical axis by a distance equal to the spacing of the first center.

The mirror unit shown in FIG. 2 is formed as shown in FIG. 3 by removing a vertically extending strip 11 from the center portion of a solid mirror element and by bringing the cut edges 12 and 13 into abutment with each other. In placing the mirror unit in the system of FIGS. 1 and 2, these abutting edges are positioned along the optical axis A—A. The amount of the removed portion 11 will be determined by the size of the mirror, the specific characteristics of the xenon lamp 6, and by the particular design and construction of the other portions of the lens system employed in the projection apparatus, but generally is of an amount sufficient to cause multiple reflected images of the source, each of which lie in the vertical plane and are offset both from each other and from the source.

The xenon arc, formed across the spaced electrodes, varies from a high intensity at the cathode 7 to a low intensity at the anode 8, and as shown in FIG. 4, forms a somewhat triangular pattern 14 in the vertical plane P. One of the physical properties of a xenon arc is that it is opaque to radiation of its source of the same radiation frequency. Accordingly, if the reflected and inverted image of a xenon light source is superimposed directly on the source, the only reflected light that will be permitted to pass through the source at any particular point will be that which possesses a higher intensity than the source. With the reflected image inverted and superimposed directly on the source, the reflected portion of the light adjacent the cathode, being of higher intensity that the source portion adjacent the anode, will pass through the source while the reflected portion of the light adjacent the anode, being of lower intensity than the source portion adjacent the cathode, will be blocked. In between the electrodes, it is apparent that the amount of reflected image passing through the source will vary depending on the relative intensities of the reflected image and source. It follows that even though a reflector may be constructed to reflect a large majority of the light source, only a portion of it will be usable for projecting onwardly of the source if the reflected image is superimposed directly on the source.

In accordance with the teachings of the present invention, the disadvantages of such an arrangement are avoided by the use of the above-described multiple mirror unit. By dividing the mirror into two parts and offsetting their centers of curvature as shown in FIG. 2, two reflected images 14' and 14" extending between reflected electrodes 7', 8', and 7", 8", respectively, may be formed in the plane P, and as shown in FIG. 4, these images will be offset from each other and offset from the source 14. With this construction the amount of reflected light being superimposed on the source may be controlled as desired; and accordingly, the amount of light available for further projection greatly increased.

As shown in FIG. 4, the source electrode 7 and its reflected images 7', 7" lie on a circle, the center of which is coincident with the optical axis A—A of the system. This is done by lowering the position of the mirror unit a slight amount; and facilitates removal of certain objectionable characteristics of the xenon light source while at the same time maintaining a high degree of illumination.

As indicated above, a xenon light source generates a great amount of heat and possesses a blue color tone in the area immediately adjacent the cathode. In accordance with the teachings of the present invention, these characteristics are removed from the system by orienting the various lenses with respect to an image of the source that is formed along the optical axis in such a manner whereby the objectionable parts of the image are formed outside the boundary of the lens system and thereby prevented from passing any further along the optical axis.

Referring again to FIG. 1, the lens system 3 of the present invention includes a first pair of lenses 16 and 17 for collecting light emitted from the source 1 into a converging beam. In the particular embodiment shown in FIG. 1, lens 16 is an aspheric lens while lens 17 is a plano-convex element. These two lenses are placed immediately adjacent each other with their more curved surfaces facing one another.

The second part of this lens system 3, comprises a negative lens 18 which is positioned in the converging beam formed by the first set of lenses 17, 16 and designed to form an image 19 of the source in a plane P' extending transversely to the optical axis A—A and at a position passing through the projection lens 5. As shown in FIG. 1, the dimension of this image 19 is larger than the diameter of the projection lens and accordingly, the periphery of the source as shown in FIG. 4 will be imaged outside of the projection lens. As pointed out above, the electrode 7 and the reflected images 7', 7", thereof all lie on a circle. When this pattern is imaged in the plane P', the electrodes 7, 7', 7" and the light immediately adjacent thereto will likewise lie on a circle. It therefore follows that the objectionable portions of the source may be imaged immediately outside the projection lens without any substantial loss of the other portions of the image.

In order to assure that the image 19 will be properly positioned with respect to the projection lens 5 and of a proper size relative to the diameter of such lens, the position of the negative lens 18 along the optical axis A—A is made adjustable. With this construction the lens system 3 including the cooperating light source 1 and reflector 2 may be constructed as a unit for insertion into a projector apparatus. Once the unit is assembled into the projector it is then necessary to simply adjust the position of the negative lens to properly focus the image 19 within the particular projection lens being used.

The projection system shown in FIG. 1 is completed by the film exposure means 4 which includes a transversely positioned aperture plate 20 and the plate, in turn, is provided with an opening 21 which is of substantially the same size as the beam of light at this position. Where movie film is to be fed through the projector on the forward side of the aperture plate, a suitable barrel shutter mechanism 22 may be included for properly exposing the individual frames of the film.

In the embodiment shown in FIG. 1, the various lenses are designed and positioned with respect to each other so as to give the proper magnification of the light source. Using a 900 watt xenon light source, for example, an acceptable magnification of five-fold can be effected within a distance of about 6 inches between the source 1 and the aperture plate 20 by using an aspheric lens 16 having a focal length of 1.25 inches, as planoconvex lens having a focal length of 2.50 inches, and a negative lens having a focal length of 3.00 inches. With these lenses properly positioned in the system both the required light magnification and desired light quality are obtainable.

Another embodiment of the present invention is shown in FIG. 5. There the second lens means of the lens system 3 is comprised of a negative lens 23 and a positive aperture lens 24 for forming the image 19 in the projection lens 5. Specifically, the desired result is obtained by positioning the negative lens 23 in the converging beam formed by the first lens means 16, 17 so as to convert the converging beam into one that is substantially collimated. This is done by positioning the negative lens 23 behind the image that would normally be formed by the first lens means 16, 17 by a distance equal to the focal length of the negative lens. With this arrangement, the beam leaving the negative lens, being substantially collimated, will be of substantially uniform intensity for transmission through the aperture plate 20 and the film, not shown.

In order to form an image in the projection lens without adversely affecting the uniformity of the light passing through the film, the aperture lens of large power is placed immediately behind the aperture plate so that the film will receive light immediately after it leaves this lens.

In addition to the above structure, a multilayer heat reflector 25 may be positioned between lenses 16 and 17 for removing heat generated by the source 1, if desired.

FIG. 6 shows still another embodiment of the present invention wherein the first lens means is comprised of two aspheric lenses 26 and 27 for forming a converging beam. As with the system of FIG. 5, a negative lens 28 is positioned along the optical axis A—A for converting this beam into one that is substantially collimated while an aperture lens 29 is provided for forming an image of the source in the plane P', which image is of a size larger than the diameter of the projection lens 5.

FIG. 7 shows still another embodiment of the present invention where the negative lens is effectively combined with the positive lens of the system. As shown, the system includes an aspheric lens 30 and a second lens 31. This second lens has a strong front convex curvature, enough glass thickness to allow for the necessary convergence, and a rear concave curvature to produce the necessary divergence. Again an aperture lens 32 is provided for forming the image 19 of proper size in the plane P'.

Finally, FIG. 8 provides a system in which both the heat and blue color tone generated about the cathode electrode of the xenon light source are eliminated prior to passage of the light through the aperture plate 20 and film. In this embodiment, the first lens means includes an aspheric lens 33 and a planoconvex lens 34 for collecting light emitted from the source into a converging beam. The second lens means in this embodiment includes a negative lens 35 that is positioned along the optical axis A—A in the plane P'' of the image 36 formed by the first lens means 33, 34. That is, the image of the source in this embodiment is formed before the light passes through the aperture plate 20 and into the projection lens 5. As shown in FIG. 8, this image 36 is of a dimension greater than the diameter of the lens 35 and accordingly the portion of the image contained in lens 35 is void of any representation of the electrode 7 or the light immediately adjacent thereto. It therefore follows that both the objectionable blue tone and heat present in this portion of the image is removed from the system at lens 35.

The lens 35 by being a negative lens functions mechanically to shorten the distance required for properly illuminating the film passed through the projector. It converts the converging beam into a substantially collimated one and forwards it to the aperture lens 37. The aperture lens, in turn, forms an image 38 in the projection lens 5. Since, however, an image of the source has already been formed and the objectionable portions of it removed from the system, the dimension of the image 38 is made substantially equal to the diameter of the projection lens 5.

As distinguished from the other embodiments already described, image 38 is not an image of the source, but an image of the first lens means; and since the light formed at the forward end of the first lens means is collimated and therefore substantially uniform in intensity, the image formed in the projection lens 5 will likewise be of substantially uniform intensity.

The above description includes a designation of the particular elements included in various embodiments of the present invention, however, it is to be understood the obvious changes may be made to these structures without departing from the scope of the invention as it is set forth in the claims that follow.

I claim:
1. An optical lens system for use in a projection apparatus having a projection lens positioned along the optical axis of said lens system and at the forward end thereof comprising:
 (a) a xenon light source positioned at a predetermined position along said optical axis and including:
  (1) a pair of spaced electrodes lying in a vertical plane extending transversely of said optical axis for forming a xenon arc extending thereacross;
 (b) a first lens means spaced along said optical axis forwardly of said source for collecting light emitted from said source into a converging beam; and
 (c) a second lens means having a concave lens surface spaced along said optical axis forwardly of said first lens means, with said surface disposed in said converging beam, for forming an image corresponding to only an intermediate portion of said light source in said projector lens.

2. An optical lens system according to claim 1 wherein:
 (a) said second lens means comprises:
  (1) a negative lens positioned in said converging beam for converting said converging beam into a substantially collimated beam, and
  (2) a positive lens positioned in said collimated beam for forming an image of said source in a transverse plane extending through said projection lens with the dimension of said image being larger than the diameter of said projection lens.

3. An optical lens system according to claim 1 wherein said second lens means comprises:
(1) a negative lens positioned in said converging beam at a point spaced from said first lens means by a distance equal to the effective focal length of said first lens means and having a diameter less than the dimension of the image formed by said first lens means for producing a substantially collimated beam, and
(2) a positive lens spaced along said optical axis in said collimated beam for forming an image of said first lens means of a diameter equal to the diameter of said projecting lens in a transverse plane extending through said projection lens.

4. An optical lens system according to claim 1 wherein said second lens means comprises:
(1) a negative lens spaced forwardly of said first lens means in said converging beam whereby an image of said source of a dimension larger than the diameter of said projection lens is formed in a transverse plane extending through said projection lens.

5. An optical lens system according to claim 4 wherein the position of said negative lens along said optical axis is adjustable.

6. An optical lens system according to claim 4 further concluding:
reflecting means spaced behind said source for forming two reflected images of said source in said vertical plane and offset from each other and from said source.

7. An optical lens system according to claim 6 wherein:
(a) said electrodes are spaced apart in a vertical direction, and
(b) said reflecting means are spaced behind said source for forming two reflected images of said source in said vertical plane and offset laterally from each other and from said source.

8. An optical lens system according to claim 7 wherein:
said reflecting means comprises two identically shaped mirrors each having a reflecting surface forming a segment of a sphere wherein the centers of curvature of said reflecting surfaces lie in said vertical plane and are spaced horizontally on opposite sides of said optical axis by equal distances.

9. An optical lens system according to claim 8 wherein:
said mirrors are formed from a segment of a sphere with a vertical portion extending through the center thereof removed.

10. An optical lens system according to claim 9 wherein:
said mirrors are positioned in abutment with each other along a plane extending vertically through said optical axis and with the center of curvature of each mirror positioned on the opposite side of said optical axis from its corresponding mirror.

11. An optical lens system according to claim 10 wherein:
one of said electrodes defines a point and it together with the two reflected images thereof lie on a circle the center of which is coincident with said optical axis.

12. An optical lens system according to claim 11 wherein:
the dimension of said image is defined by the diameter of the image of said circle formed in said transverse plane extending through said projection lens.

13. An optical projection system comprising
(a) a xenon light source;
(b) a first lens means spaced from said source along the optical axis of said system for collecting light emitted from said source into a converging beam;
(c) an aperture plate spaced along said optical axis forwardly of said first lens means;
(d) a projection lens means spaced along said optical axis forwardly of said aperture plate; and (e) a second lens means having a concave lens surface spaced along said optical axis between said first lens means and said aperture plate, with said surface disposed in said converging beam and having a diameter at least equal to the diameter of said converging beam at said surface, for forming an image in a transverse plane extending through said projection lens means that is of a dimension larger that the diameter of said projection lens.

14. An optical projection system comprising:
(a) a xenon light source;
(b) a first lens means spaced from said light source along the optical axis of the system for collecting light emitted from said source into a converging beam;
(c) a second lens means spaced along said optical axis and positioned within said converging beam for converting said converging beam into a substantially collimated beam of a first predetermined diameter;
(d) an aperture plate spaced along said optical axis within said collimated beam and having an opening transverse to said optical axis of a size substantially equal to said first predetermined diameter;
(e) a third lens means positioned along said optical axis immediately behind said aperture plate for producing an image of predetermined dimension in a transverse plane spaced along said optical axis on the other side of said aperture plate; and
(f) a projection lens of a second predetermined diameter smaller than said predetermined dimension positioned along said optical axis at a position which includes said transverse plane.

15. An optical projection system according to claim 14 wherein:
said second lens means is a negative lens, the position of which along said optical axis is adjustable for varying the size and position of the image formed by said third lens means.

16. An optical projection system comprising
(a) a xenon light source
(b) a first lens means spaced from said source along the optical axis of said system for collecting light emitted from said source into a converging beam and for producing a source image of predetermined dimension forwardly thereof;
(c) a second lens means of a diameter less than said predetermined dimension spaced along said optical axis in the plane of said source image for converting said converging beam into a substantially collimated beam;
(d) an aperture plate spaced along said optical axis within said collimated beam and having an opening of a diameter substantially equal to the diameter of said collimated beam;
(e) a third lens means positioned along said optical axis immediately behind said aperture plate for forming an image of said first lens means in a transverse plane spaced along said optical axis forwardly of said aperture plate; and
(f) a projection lens means spaced along said optical axis in the plane of the last formed image and having a diameter substantially equal to the dimension of said last formed image.

17. A lighting system for use in an optical lens system comprising
(a) a pair of spaced electrodes lying in a predetermined plane;
(b) means for forming a xenon light source extending across said electrodes in said plane; and
(c) curved reflecting means spaced from said light source and having all centers of curvature disposed in said plane and offset from said light source for forming a reflected image of said source in said plane and at a position offset from said source.

18. A lighting system for use in an optical lens system comprising (a) a pair of spaced electrodes lying in a predetermined plane;
(b) means for forming a xenon arc light source extending across said electrodes; and
(c) curved reflecting means spaced from said source along an axis which extends perpendicular to said plane and is positioned below the center of a line extending between said electrodes and having all centers of curvature disposed in said plane and offset from said light source for forming two reflected images of said source in said predetermined plane offset from each other and from said source.

19. A lighting system according to claim 18 wherein: said reflecting means are positioned for forming each of said reflected images offset in two directions along said plane.

20. A lighting system according to claim 19 wherein: said reflecting means comprises two identically shaped mirrors each having a reflecting surface of a segment of a sphere wherein the centers of curvature of said reflecting surfaces lie in said predetermined plane at distances spaced equally from said axis in a direction extending at acute angles to said line.

21. A lighting system according to claim 20 wherein: said mirrors are formed from a segment of a sphere with a center strip portion lying in a plane extending through said line removed.

22. A lighting system according to claim 21 wherein: said mirrors are positioned in abutment with each other along said last mentioned plane and with the center of curvature of each mirror positioned on the side of said last mentioned plane opposite its corresponding mirror.

23. A lighting system according to claim 22 wherein: one of said electrodes defines a point and it together with the two reflected images thereof lie on a circle the center of which is coincident with said axis.

References Cited by the Examiner

UNITED STATES PATENTS

| 2,192,886 | 3/1940 | Bergmans et al. | 88—24 |
| 2,787,935 | 4/1957 | Inoue | 88—24 |
| 3,039,022 | 6/1962 | D'Arcy | 352—198 |
| 3,076,377 | 2/1963 | Brownscombe | 88—24 |

FOREIGN PATENTS

| 1,069,899 | 11/1959 | Germany. |
| 1,129,310 | 5/1962 | Germany. |

NORTON ANSHER, *Primary Examiner.*

VANCE A. SMITH, *Assistant Examiner.*